Nov. 7, 1961  B. LERMONT  3,007,239
METHOD OF MAKING SPRINGS
Original Filed May 28, 1949  5 Sheets-Sheet 1
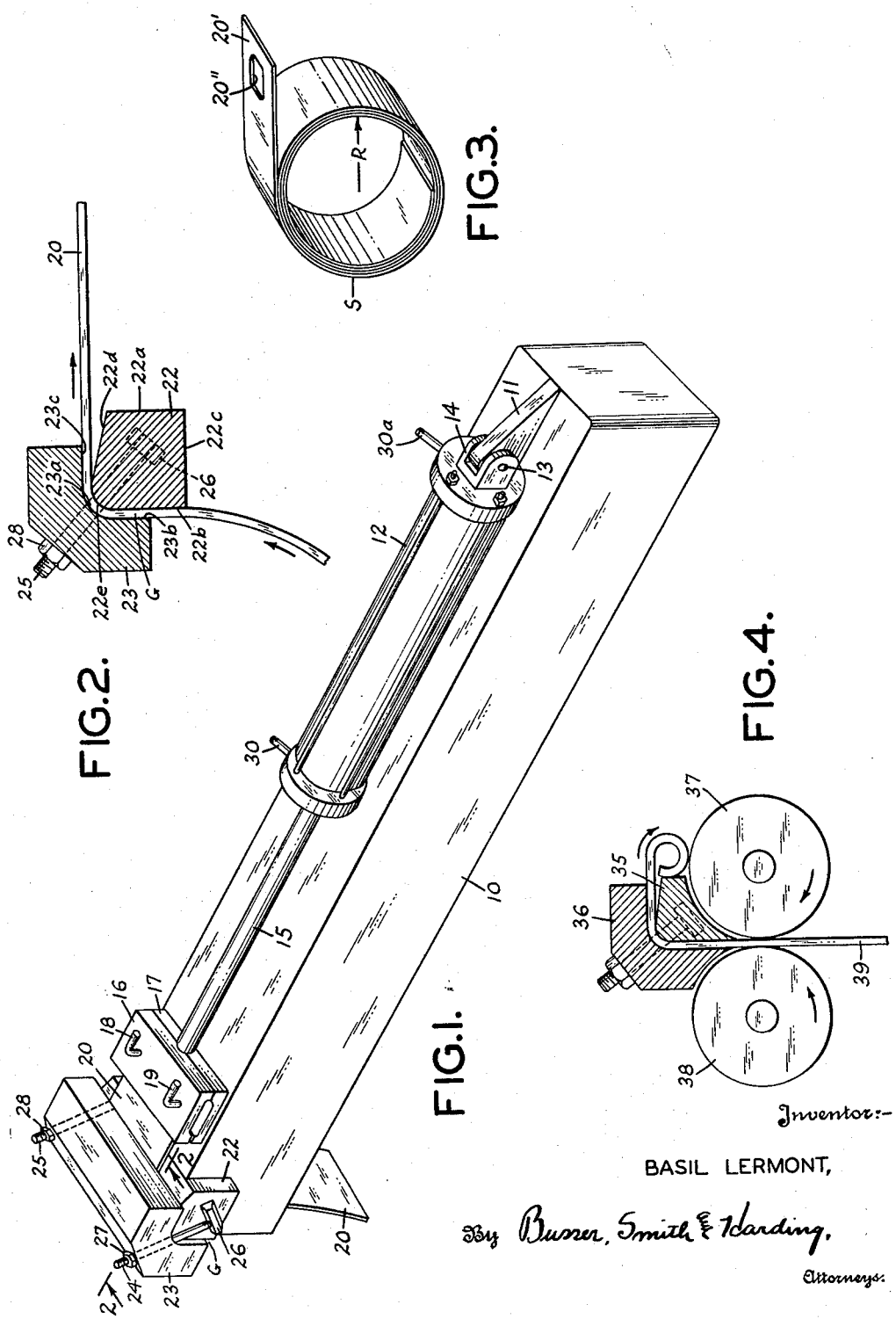
BASIL LERMONT,
By Busser, Smith & Harding,
Attorneys.

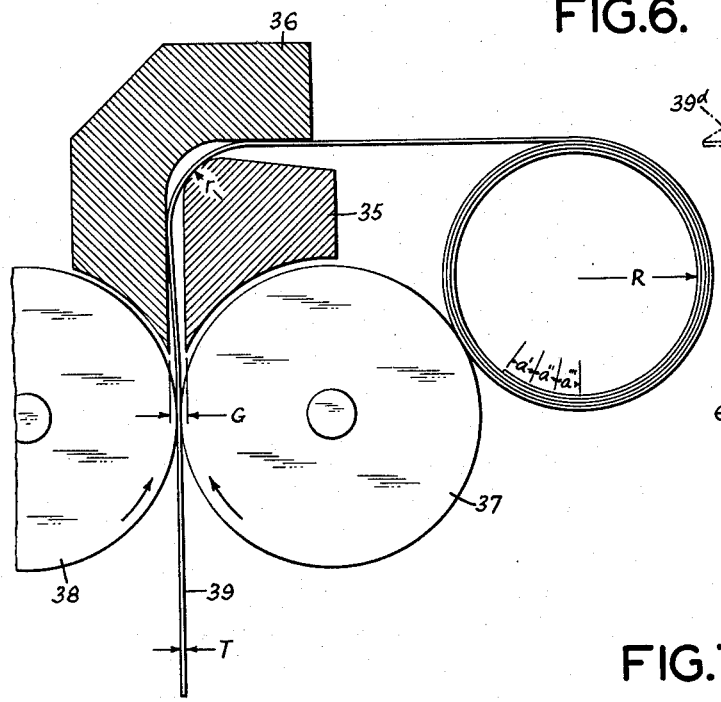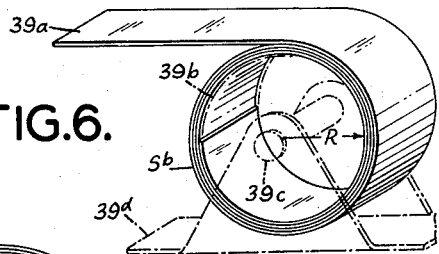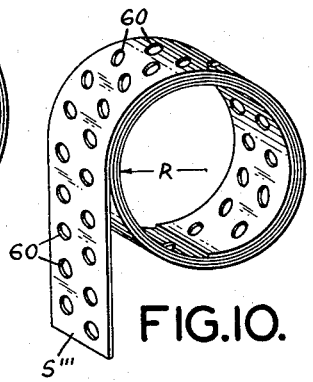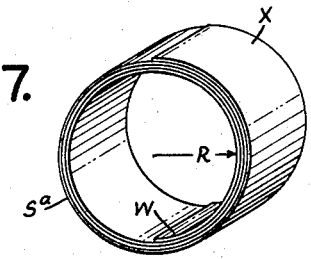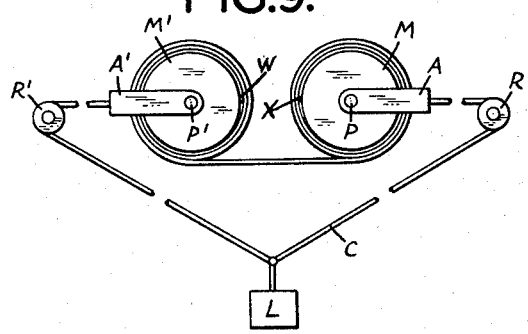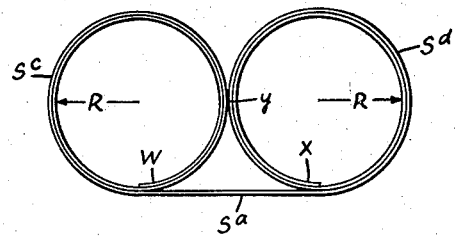

Nov. 7, 1961  B. LERMONT  3,007,239
METHOD OF MAKING SPRINGS
Original Filed May 28, 1949  5 Sheets-Sheet 3

Inventor:-
BASIL LERMONT,
By Busser, Smith & Harding,
Attorneys.

Nov. 7, 1961    B. LERMONT    3,007,239
METHOD OF MAKING SPRINGS
Original Filed May 28, 1949    5 Sheets-Sheet 4
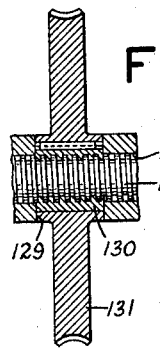
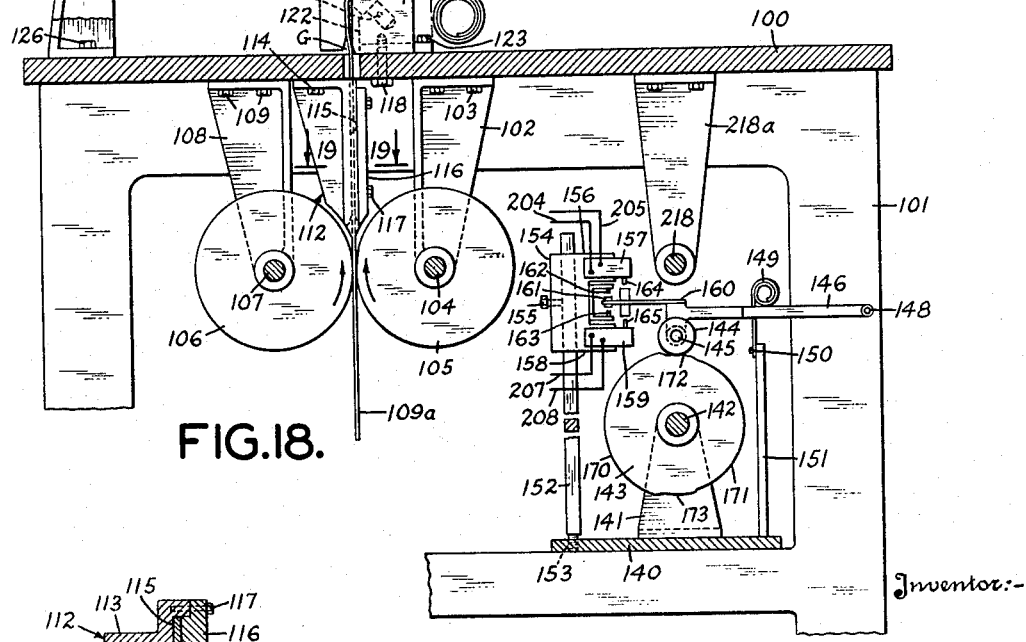
Inventor:-
BASIL LERMONT,
By Busser, Smith & Harding,
Attorneys.

Nov. 7, 1961    B. LERMONT    3,007,239
METHOD OF MAKING SPRINGS
Original Filed May 28, 1949    5 Sheets-Sheet 5
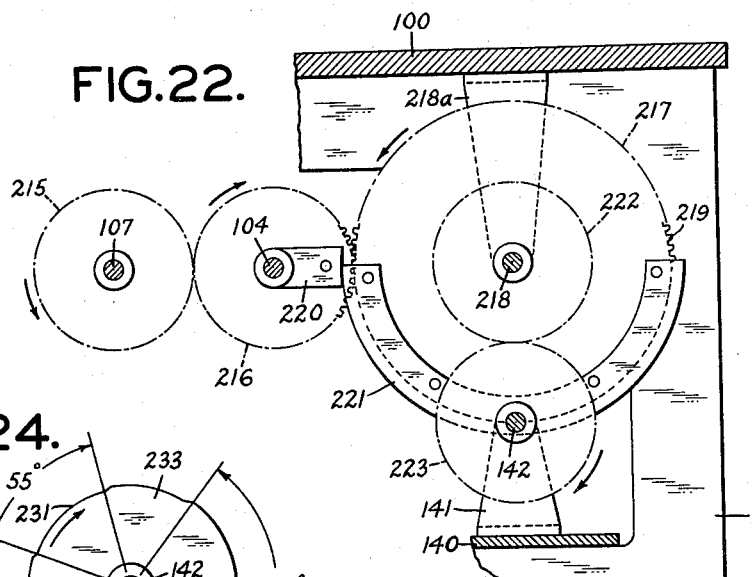
FIG.22.
FIG.24.
FIG.25.
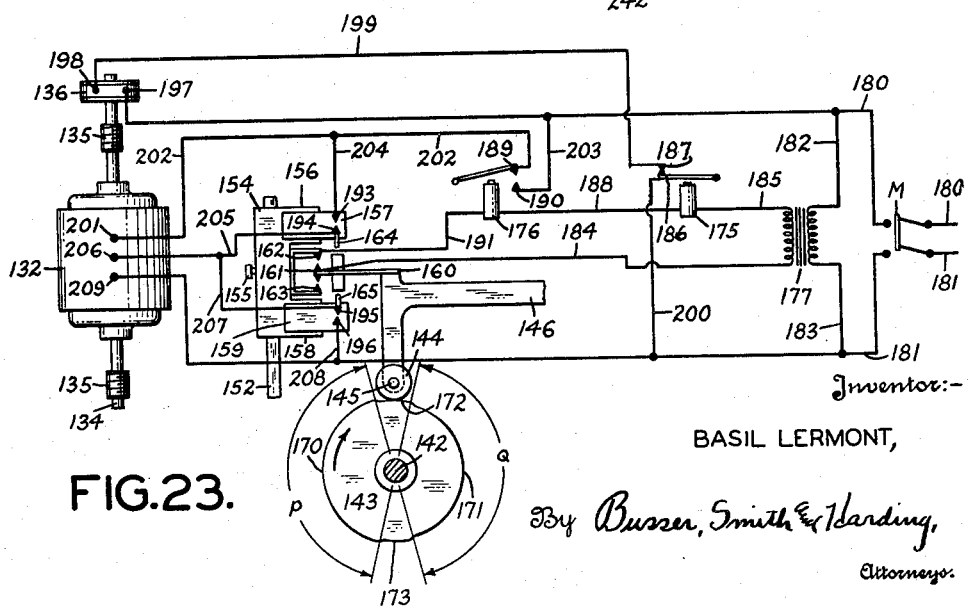
FIG.23.
Inventor:-
BASIL LERMONT,
By Busser, Smith & Harding,
Attorneys.

United States Patent Office 3,007,239
Patented Nov. 7, 1961

3,007,239
METHOD OF MAKING SPRINGS
Basil Lermont, New York, N.Y., assignor, by mesne assignments, to American Machine and Metals, Inc., New York, N.Y., a corporation of Delaware
Application Aug. 22, 1952, Ser. No. 305,899, now Patent No. 2,801,669, dated Aug. 6, 1957, which is a division of application Ser. No. 95,956, May 28, 1949, now Patent No. 2,609,192, dated Sept. 2, 1952. Divided and this application Nov. 21, 1956, Ser. No. 623,683
4 Claims. (Cl. 29—173)

This invention relates to certain improvements in methods for manufacturing coil springs, and particularly to methods for producing springs which are characterized by varying resistance to unwinding and/or equal resistance to unwinding or straightening (constant tension) at all zones along the length of the springs.

This application is a division of my application Serial No. 305,899, filed August 22, 1952, and issued August 6, 1957, as Patent No. 2,801,669, which, in turn, is a division of my application Serial No. 95,956, filed May 28, 1949, and issued September 2, 1952, as Patent No. 2,609,192. Application Serial No. 95,956, supra, is a continuation-in-part of my now abandoned application Serial No. 747,189, filed May 10, 1947.

It has been usual heretofore in the production of spiral springs and other types of springs to twist or wind a strip of metal on a mandrel or cylindrical form to bend the spring into a desired shape. This coiled strip of metal is then tempered or otherwise treated to render it resilient and to fix or "set" its normal shape. Due to the method of formation of such spiral springs, each increment of the spring assumes a slightly different radius of curvature in conformance with its initial state of winding with the result that the force required to straighten any given increment differs from the force required to straighten all the other increments of the spring.

It has also been usual heretofore in spring forming machines, to bend wire stock on a constant radius and to employ a skew or pitch member to continuously deflect the bent material axially into a helix, rather than to allow the material to coil tightly upon itself into a spiral with its convolutions disposed in a substantially common radial plane.

It has been further suggested heretofore that coils of metal tinsel strip and other articles can be formed by drawing a strip of metal over a sharp edge to bend the strip and cause it to coil into generally helical form. Such coiled tinsel strips are commonly used in the production of scouring pads which are used for cleaning kitchen utensils and the like. It appears that the tendency of the strip to form a helix rather than a spiral arises because the strip is maintained under tension while it is drawn over the forming head, thereby producing a flow of the metal of unequal magnitude along the strip. It has also been suggested that circular hoops for wagon tires or the like could be produced by passing a strip of metal between a pair of rollers and then deflecting or bending the strip by pushing it against the periphery of a third roller or abutment member so that the strip tends to form a circle or annular ring.

None of these prior devices has been used to produce a self-winding coil spring, each increment of which is purposely bent on the same radius of curvature and/or on a predetermined varying radius of curvature, and which is essentially constant in its resistance to straightening or unwinding throughout its entire length, so that the spring acts much in the manner of a counterweight when suitably assembled with a support or mounting, rather than as a member of variable tension throughout its length.

In accordance with the present invention, such a constant tension spring, that is, a spring every increment of which requires an equal force to straighten it, is produced by drawing or passing a strip of metal between two forming elements to bend the strip partially so that every increment of the spring is bent on an equal radius and so the convex surface portion is stretched while the concave surface portion either is unstretched or actually is compressed slightly. Due to the uniform deformation of the strip, every increment of it is stressed equally and it will tend to coil into one or more convolutions each of which has the same radius of curvature when unrestrained.

When such a spring is mounted so that it can turn freely and a force is exerted on one end of the spring tending to unwind it, it acts very much like a counterweight for the reason that any tension applied to the spring will tend to straighten that portion which is tangent to the outer surface of the coiled portion of the spring. Inasmuch as every increment of the spring is equally stressed and bent, the force required to straighten any given portion of the spring is exactly the same as the force required to straighten any other portion of the spring. Therefore, the resistance to straightening or drawing out of the spring is not cumulative. That is to say, a force strong enough to straighten or unwind one end of the spring will, if continuously applied, completely straighten out or unwind the entire spring, assuming, of course, that the convolutions or coils of the spring are all allowed to assume their normal state. Thus, a spring which has been formed with a predetermined constant radius of curvature and is equally stressed throughout, if allowed to form itself into a plurality of independent coils or convolutions in which each coil is not obstructed or distorted by contact with other convolutions, will have the above-mentioned constant tension characteristics. On the other hand, if the spring is allowed to coil upon itself, that is, to coil into a tightly wound spiral, the constant tension characteristics are modified by the following factors. It is evident that no two of the convolutions, even if equally bent, can occupy the same space. As a result, one or both of the convolutions must flex to different curvatures from their normal constant radius of curvature. Therefore, when a straightening force is exerted on the free end of the spring, a greater or lesser straightening will result as the spring unwinds, and the force required to straighten the spring will vary accordingly.

Also, in the case of a spirally coiled but constant radius spring, the radius or moment arm of the force acting on the spring becomes less and less as the spring is unwound, thereby requiring an increasing force to unwind the spring.

To overcome the effects of the varying moment arm and the partial straightening of the spring because of space limitations, in spirally coiled springs, the spring can be modified either by varying the resistance to straightening throughout the length of the spring, for example, by varying its radius of curvature throughout so that the outer end portion of the spring normally tends to curve, when in repose, on a shorter radius than its inner end portion, or by tapering or perforating the spring throughout its length. These variations in the spring should be such as to just offset or compensate for the change in deflection of the spring and the change in the length of the moment arm of the spring as it coils and uncoils.

The forming devices disclosed herein are capable of producing springs formed with any desired constant radius or with any desired varying radius. The radius of curvature of the spring can be modified by adjusting the sharpness or abruptness of the bending of the spring material, and in order to accomplish this function, different anvil blocks or die members, having different radii of curvature may be used, or an anvil member of a fixed curvature but having a cooperating adjustable retaining or hold-down member for altering the width of the gap between the two members to correspondingly vary the radius of bending of the strip, may be provided.

The manner in which the strip is passed through the gap between the die members may be varied. Preferably, the strip is drawn over the die member without any tension being exerted on the trailing end of the strip. If the strip is of sufficiently heavy gauge, it may be forced over the anvil or die member by means of suitable feed rollers so that the strip is not maintained under tension during its forming operation.

The principal object of the present invention is to provide springs having constant and/or variable tension characteristics, and methods for producing such springs.

For a better understanding of the present invention, reference may be had to the accompanying drawings, in which:

FIG. 1 is a diagrammatic perspective view of a typical form of apparatus for making springs of the type embodying the present invention;

FIG. 2 is a view in section through the die or forming elements taken on line 2—2 of FIG. 1;

FIGS. 3 is a perspective view of a coil spring of a character which can be formed by the apparatus illustrated in FIGS. 1 and 2;

FIG. 4 is a diagrammatic illustration of a modified form of spring-forming device involving the use of feed rollers for pushing the strip through the die gap;

FIG. 5 is a diagrammatic view illustrating the relationship between a piece of spring material and a pair of dies, such as shown in FIG. 4, during the bending operation on the spring material to form it into a coil spring;

FIG. 6 is a perspective view of a constant tension spring which can be made by the apparatus of FIGS. 4 and 5, the spring, however, being shown assembled with a support;

FIG. 7 is a perspective view of a spring in which all increments thereof are bent upon a given constant radius;

FIG. 8 is an elevational view of a spring of the type shown in FIG. 7, wherein portions of the spring are wound in reverse directions;

FIG. 9 is a diagrammatic view illustrating one practical application of the constant tension spring shown in FIG. 8;

FIG. 10 is a perspective view of a spring which is perforated to modify its tension characteristics to compensate for variations in the moment arm and inability of a plurality of convolutions of the spring to occupy the same space;

FIG. 18 is a diagrammatic view, partly in cross-section, of another form of automatic machine for bending spring material upon any desired radius of curvature, either constant and/or progressively increasing or decreasing;

FIG. 19 is a detail sectional view taken on the line 19—19 of FIG. 18;

FIG. 20 is a plan view of the automatic machine shown in FIG. 18;

FIG. 21 is a detail sectional view taken on the line 21—21 of FIG. 20;

FIG. 22 is a diagrammatic view illustrating one form of driving mechanism for the machine shown in FIGS. 18 to 21;

FIG. 23 is a diagrammatic view illustrating a cam and other elements associated with an electrical circuit for automatically controlling the machine;

FIG. 24 illustrates a modified form of cam adapted to be substituted in the control mechanism shown in FIG. 23 to form a spring having the end portions thereof formed on uniformly varying curvature and the intermediate portion thereof bent upon a constant radius; and FIG. 25 is a schematic view of a coil spring that can be formed under the control of the cam shown in FIG. 24.

Figure 15:
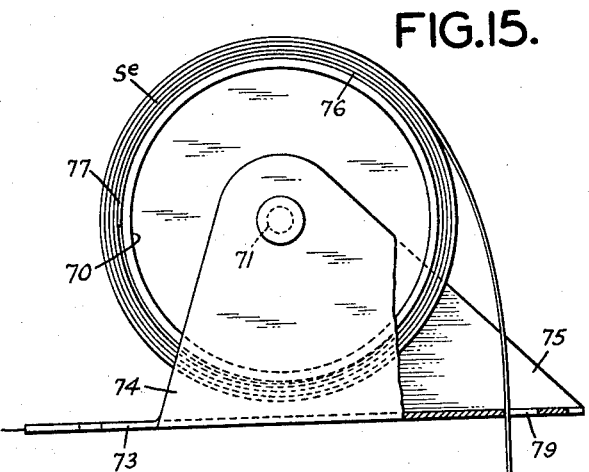
FIG. 15 is an elevational view of another spring assembly including a spring, which may be formed on a constant radius by the apparatus shown in FIG. 4 or formed on a progressively varying radius by the apparatus shown in FIG. 14, adapted to serve as a counter-balance for a window sash (not shown)

The apparatus described hereinafter is typical of the many different forms of devices by means of which springs of the type embodying the invention can be produced and, therefore, should be considered as illustrative only.

Referring now to FIG. 1, a simple form of apparatus for forming springs of the type embodying the present invention may consist of a base member 10 which may take the form of a block of reinforced concrete or a metal beam having at one end an upstanding lug 11 to which the cylinder 12 of a hydraulic jack is fixed by means of a pivot pin 13 extending through the clevis 14 at the end of the cylinder and through the lug 11.

The piston rod 15 of the cylinder is provided with a pair of pivotally connected gripping jaws 16 and 17 having suitable hand screws 18 and 19 therein for forcing the blocks 16 and 17 together to grip the end of an elongated piece or sheet of flexible metal 20, from which a spring is to be formed. The sheet 20 can be of any of the conventional types of spring steel or an alloy, such as a beryllium-copper alloy. It may even be formed of stainless steel which has been found to have excellent spring properties when treated in accordance with the present invention.

The opposite end of the base member 10 is provided with an anvil block or lower die member 22, which, as best shown in FIG. 2, may consist of a bar of metal having parallel opposite sides 22$^a$ and 22$^b$, a lower side 22$^c$ which is perpendicular to the sides 22$^a$ and 22$^b$ and an upper side 22$^d$ which is inclined at an acute angle to the side 22$^b$. The junction of the sides 22$^b$ and 22$^d$ is curved to form a generally arcuate or rounded convex surface 22$^e$ of a radius of curvature which is dependent upon the desired radius of curvature of the spring being formed, as will appear more fully hereinafter.

The strip 20 passes over the rounded surface 22$^e$ and is bent into conformity with the shape of this surface by means of a second die block or hold-down member 23. This hold-down member preferably is provided with a recessed undersurface having a concave surface portion 23$^a$ which is concentric with the surface 22$^e$. On opposite sides of the concave surface 23$^a$ are right angularly related surfaces 23$^b$ and 23$^c$ which engage the outer surface of the strip 20 and aid in bending it around the surface 22$^e$. As will be obvious from FIG. 2, the surfaces 22$^b$, 22$^d$, 22$^e$, 23$^a$, 23$^b$ and 23$^c$ cooperate to define an angular or generally L-shaped gap therebetween. The shape of the upper and lower die blocks 23, and 22, respectively, aside from the relationship of the surfaces 22ᵇ, 22ᵈ and 22ᵉ and the surfaces 23ᵃ, 23ᵇ, and 23ᶜ, is unimportant.

The two blocks 22 and 23 are retained in their desired relationship by means of the stud bolts 24 and 25 at opposite ends of the die members 22 and 23. The lower end of the stud bolt 24 is anchored in a lug 26 on the end of the die block 22 while the upper end passes through an opening in the upper member 23 to receive a nut 27 for clamping the two die members together. The stud bolt 25 is similarly mounted at the opposite end of the die block 22 and is provided with a nut 28 for holding the die members 22 and 23 in contact with the sheet 20. The bolts 25 extend in a plane A—A (FIG. 2) coinciding with a radius passing through about the midpoint of the arc defining the rounded edge 22ᵉ.

In operation, the piston rod 15 is advanced by admitting fluid into the cylinder 12 through the conduit 30ᵃ until the gripping plates 16 and 17 are closely adjacent to the die block 22 and the end of the sheet of metal 20 is threaded through the gap G between the die blocks 22 and 23 while they are spread apart a greater distance than the thickness of the sheet. The end of the sheet is then clamped between the gripping plates 16 and 17, and the upper die block member 23 is tightened down by adjustment of the nuts 27 and 28 until the portion of the sheet 20 between the die blocks is bent into conformity with the curvature of the forming surface 22ᵉ. Pressure is then applied to the cylinder 12 through the conduit 30 to draw the sheet 20 over the curved forming edge 22ᵉ, thereby bending the sheet sharply and stretching the outer portion of the sheet. Such stretching imparts a permanent set to the metal, and when the free trailing edge of the sheet finally passes by the forming edge 22ᵉ, the sheet will coil tightly upon itself with its convolutions disposed in a substantially common radial plane to form the spring S shown in FIG. 3. The drawing action of the cylinder, while having some tendency to straighten the sheet 20, has been found to act equally throughout the length of the sheet so that while its radius of curvature R is considerably greater than the radius of curvature of the forming surface 22ᵉ, the amount of curvature throughout the length of the bent portion of the sheet is exactly the same for any increment thereof. The end 20' of the strip 20 which was clamped between the jaws 16 and 17 remains straight, as shown, and may be provided with an opening 20'' to facilitate attachment thereof to any object.

Springs of still greater radius of curvature can be produced by loosening the nuts 27 and 28 separately or simultaneously to permit die block 23 to retract somewhat to increase the width of the gap G so that the sheet 20 is not bent as much as when the block 23 is held down tightly against the upper surface of the sheet. The nuts 27 and 28 can obviously be manually adjusted while the sheet 20 is stationary, or in motion. Also, interchangeable die blocks may be used in which the radii of curvature of the surfaces 22ᵉ and 23ᵃ are greater or lesser in order to form springs of different curvatures.

In order to offset any tendency of the cylinder 12 and the piston 15 to straighten the strip or sheet, springs may be produced by forcing, instead of pulling, the strip between die blocks similar to those described above. As shown in FIG. 4, the die blocks 35 and 36 therein may be similar to the die blocks 22 and 23. The lower die block 35 is supported in a suitable frame, not shown, which also supports a pair of driven feed rollers 37 and 38.

The elongated piece or sheet of metal 39 is gripped between the rollers 37 and 38, which are positively driven in opposite directions by means not shown, to force the sheet 39 between the die block members 35 and 36 so that the sheet will be bent as described above and will form a tight coil at the discharge end of the die blocks 35 and 36.

In forming coil springs with the apparatus shown in either FIGS. 2 or 4, it is generally preferable to have the die members 23 and 36 spaced from the die members 22 and 35, respectively, a distance somewhat greater than the thickness of the material which is passed therebetween. The width of the space or gap between the dies 35 and 36, as indicated by the dimension G in FIG. 5, will vary with the character and thickness T of the spring material. The draw radius R, or radius of curvature of the rounded edge 22ᵉ of the die member 22 and the corresponding edge of the die member 35, will also vary with the character and thickness of the spring material. Assuming that the spacing or gap G between the die members is not adjusted during a spring-forming operation, then the radius R will be constant for any increment $a'$, $a''$, or $a'''$ of the spring material passed between the die members. The bend radius, of course, can be varied by increasing or decreasing the dimension of the gap G so that coils having any predetermined constant or varying radius of curvature can be produced, as desired.

The radius of curvature R will also be predetermined in the light of practical consideration by proper design of the die members with due consideration being given to the kind of material employed and its dimensions, as will appear hereinbelow.

For most purposes, resilient, cold rolled strip material is preferred. By way of operative examples, the springs may be made of high carbon strip steel, S.A.E. No. 1095 having a width of ½" and a thickness of 1/64" (.016). When this particular material is used, it is preferable to use a die block in which the draw radius R is 1/16" or .0625", and the gap G between the die blocks is .038". Each resulting coil will then tend to assume a normal diameter of 1⅜" or 1.375", with each successive increment of the spring bent upon a constant radius R. Such a spring has been found to require a constant force of only 66 ounces, or 4 lbs. and 2 ounces to effect unwinding thereof regardless of the number of convolutions that are unwound.

As a further operative example of the invention, the springs may be formed of a strip of stainless steel having a thickness of .011" and a width of 1". In coiling such material, the draw radius R on the die block is preferably 5/32" or .156" and the gap G between the die blocks is preferably .016". The resulting coils will then have a normal diameter of 1 1/16" with each increment bent upon a constant radius of curvature R. The load tension capacity of such spring is 60 ounces, or 3 and ¾ lb.

The cross-sectional shape of the material from which the spring is formed can be varied substantially. Thus, the spring can be formed of wire or the like, of circular, square or triangular cross-section or from thin strip material and the like of any suitable width.

The spring material 39 may be fed from a supply roll (not shown) or consist of strips of predetermined length, which may be bent upon a constant radius throughout to form a coil spring Sᵃ, as illustrated in FIG. 7. On the other hand, a predetermined length of the material 39 may be bent upon a constant radius and a portion left unbent to provide a spring Sᵇ having an end 39ᵃ which is in a straight condition, as shown in FIG. 6. In the event of the latter, the die blocks 35 and 36 are separated when the desired portion of the spring has been bent, so that the end portion 39ᵃ of the spring material remains unbent or straight. When the spring material 39 is fed from a supply roll, completed springs can be severed by conventional cut-off means (not shown).

In FIG. 6, the spring Sᵇ is operatively assembled with supporting means shown in dot-and-dash lines and comprising a drum 39ᵇ (to which the inner end of said spring can be secured, if desired) supported upon a shaft 39ᶜ rotatably mounted in a bracket 39ᵈ.

The spring shown in FIG. 7 has an inner end W and an outer end X. The latter end may be unwound and then rewound, as illustrated in FIG. 8, to form two coil portions S$^c$ and S$^d$. In such case, the pressure at the zone of contact of the coils, indicated by the letter Y, will be substantially constant irrespective of the number of convolutions comprising the respective coil portions S$^c$ and S$^d$. As illustrated, each coil portion S$^c$ and S$^d$ comprises two convolutions, the outermost of which are inherently urged toward each other by a force effective at Y. The force at Y would be substantially the same if one of the coil portions had only one convolution and the other had three.

FIG. 9 diagrammatically illustrates one practical application of the type of coil spring shown in FIGS. 7 and 8. Here, the end X of the spring is wound around a roller M rotatably mounted upon a pin P carried between the arms of a yoke A. The opposite end W of the spring is wound around a similar roller M' rotatably mounted upon a pin P' carried by another yoke A'. The arms A and A' are connected together by means of a cable or cord C which is looped over the pulleys or rollers R, R' and passes below them so that the spring continuously tends to move the rollers M and M' toward each other. Such movement is opposed by a load L acting downwardly at the midpoint of the cable C, the net result being that the rollers can be maintained spaced apart any desired distance without increasing the load L. It will be obvious from this illustration that the constant tension spring S$^a$ may be used in any environment where it is desired to maintain a constant tension on two elements even though the distance between the parts is required to be varied from time to time.

should the springs S and S$^b$ shown in FIGS. 3 and 6, respectively, be used in their coiled condition, the moment arm of successive convolutions will vary, so that the force required to unwind the springs will increase as the springs are unwound and their moment arms become shorter. Compensation in the way of a correction factor may be made for moment arm variations and true constant tension characteristics provided by varying the bending radius the required amount during fabrication. Alternatively, spring material of tapered width and/or thickness may be employed so the moment arm times the force required to unwind any increment of the spring equals a constant.

Compensation for variation in the length of the moment arm of the force required to straighten or tending to rewind the spirally coiled spring can also be had by perforating the spring matreial in such a way as to render the outer end of the spring less resilient than the inner end. Thus, as shown in FIG. 10, the partially uncoiled spring S''' has a series of perforations 60 therein. These perforations are spaced apart gradually decreasing distances from the outer end of the spring to the inner end of the spring. This latter variation of the spring is difficult to practice in many production operations, as is the production of tapered springs, and therefore, these modifications are the least preferred modifications.

It appears that the constant tension characteristics of preferred types of springs arise largely from the fact that the portion of the spring being bent by the dies 35 and 36 is not maintained under tension, and the spring is merely bent, rather than stretched, during its formation. Because of the lack of stretching, which would cause elongation of the spring material during its formation into the spring, there is no tendency for the spring to develop weak zones at its center or along its edges, which would vary the coiling characteristics of the spring.

Assuming that the above-described springs are bent on the same radius of curvature, each convolution thereof normally tends to form a circle of the same diameter. However, inasmuch as all of the convolutions of the spring cannot occupy the same space, the spring must initially form a spiral with the convolutions in contact and pressing against each other.

Figure 11:
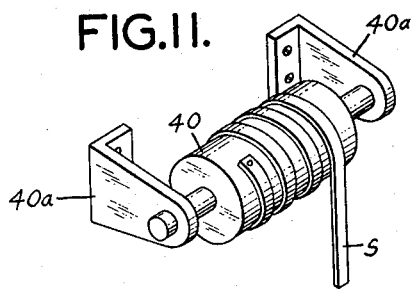
FIG. 11 is a perspective view illustrating another practical application of the present spring, wherein the spring is supported on a rotatable shaft or arbor for producing a constant tension effect.

Springs of the type produced in accordance with the method and apparatus described above can be duplicated in quantity and with a high degree of accuracy in their characteristics. These springs are uniform in their characteristics throughout and are especially suitable for use where a uniform tension is required from the spring regardless of the amount that the spring is extended. Thus, when the spirally coiled spring S is drawn out endwise into helical form, as shown in FIG. 11, and one end of the spring, which may be either end, is secured to a rotary shaft or other member 40 mounted in supports 40$^a$, the free end of the spring may be drawn out to unwind the spring by the application of a uniform force thereto. The force applied need not exceed that required to start the spring unwinding, to completely unwind the spring. The spring, therefore, acts very much like a counterweight of fixed value in any of its wound, partially wound or unwound states. Thus, the spring exerts as much tendency to wind up or coil at its inner end as it does at its outer end, and therefore, compensation need not be made for the extent of unwinding of the coil as is common in the conventional spiral coil springs. The same results are obtainable if the shaft 40 is omitted and the spring is mounted in such a way as to permit free body rotation of the spring as one of its ends is drawn out.

Figure 12:
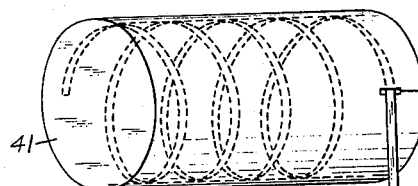
FIG. 12 is a perspective view of a modified form of mounting for a spring having constant tension characteristics.
Figure 13:
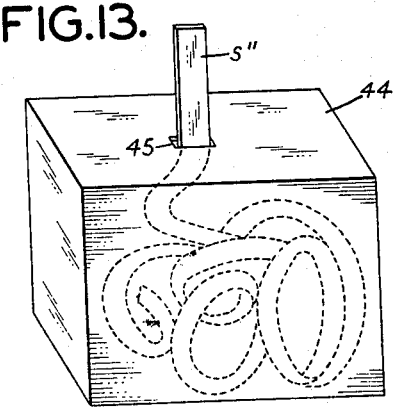
FIG. 13 is a perspective view illustrating another form of spring assembly having constant tension characteristics.

As shown in FIG. 12, a spring S' of helical form, like the spring S described above, may be mounted loosely in a cylindrical receptacle 41 having a slit 42 in one wall through which one end 43 of the spring extends. When a force of sufficient magnitude is exerted on the end 43 of the spring S', the spring will rotate bodily in the receptacle 41 permitting the spring to unwind. Upon release of the force, the spring S' will wind itself up in the receptacle either as a helix or as a group of convolutions of equal radius. These convolutions do not necessarily assume a helical shape and advantage can be taken of this fact to permit a very long spring to be mounted in a relatively small space, as shown in FIG. 13. For example, a long slender spring S'' bent on a uniform radius of curvature will have constant tension characteristics if permitted to coil loosely or at random into a series of convolutions of generally ball-like shape. If this ball-like mass is mounted for free rotation in a hollow, box-like receptacle 44, the spring S'' may be drawn out through a slot 45 in the receptacle, thereby uncoiling the spring. Release of the withdrawn end of the spring will permit it to coil up again into the loose ball-like shape.

While the springs of uniform radius of curvature cannot provide truly constant tension characteristics when used as spirally coiled springs, it is possible to modify the characteristics of such spirally coiled springs to provide the desired constant tension characteristics when mounted in the manner described above, that is, for free rotation of the spring as a whole. This may be accomplished, as stated, by using tapered stock (width and/or thickness) which, when bent on a constant radius, will have the larger section at the outer end of the coil. The larger sectional area and the consequent greater resistance to straightening offsets or compensates for the longer moment arms through which the applied force acts to straighten and unwind the spring. It also compensates for the partial straightening of the spring due to the inability of all of the convolutions to occupy the same space.

Generally, the same effect may be produced by bending the spring on a uniformly varying radius so that the outer end is bent on the shortest radius and the inner end is bent on the longest radius. This effect can be obtained with my above-described apparatus by careful manual adjustment of the die elements 22—23 and 35—36, while the spring is being formed, but it is preferable to provide a modified automatic apparatus which will constantly vary the gap between the upper and lower die elements during a forming operation.

Figure 14:
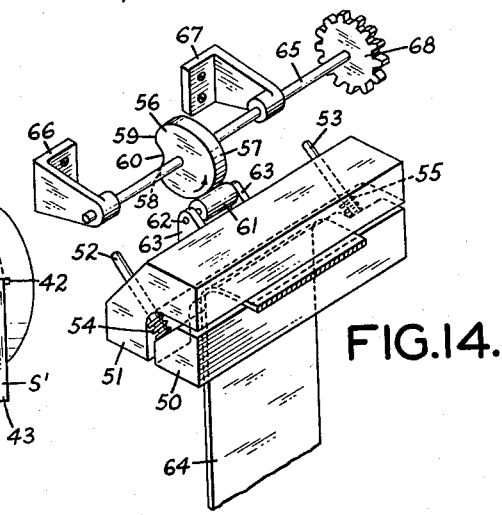
FIG. 14 is a diagrammatic perspective view of a modified form of apparatus including a control cam for automatically making constant tension springs having a uniformly varying radius of curvature.

A typical apparatus for this purpose is shown in FIG. 14. This apparatus includes the same general arrangement of die or forming elements 50 and 51 as those shown in FIGS. 1 and 4. Instead of employing the clamping bolts and nuts shown in these figures, the modified device is provided with guide rods 52 and 53 which carry springs 54 and 55. These springs normally urge the forming members 50 and 51 apart.

A cam 56 is provided with a peripheral portion 57 which uniformly decreases in radius in a counterclockwise direction from a point 58 to a point 59 and has a depression 60 between said points. The cam 56 is engaged with a roller 61 carried by a pin 62 mounted in lugs 63 formed on the die member 51. The cam portion 57 is designed so that it gradually moves the die member 51 toward the die member 50 as the cam is rotated. This results in bending successive increments of the spring material 64 on a progressively decreasing radius of curvature, so that the inner end of the spring thus formed has a greater radius of curvature than its outer end and the force required to straighten any increment of the spring is the same for all increments, regardless of changes in the physical length of the moment arm. When the depression 60 is engaged with the roller 61, the die members 50, 51 are permitted to move apart their maximum distance under the action of the springs 54, 55. Reversing the cam, or reversing its direction of rotation, will result in a coil spring having its outer end portion bent upon a greater radius of curvature than its inner end and such spring may be useful for certain purposes.

The cam 56 may be mounted on a shaft 65, which is supported in bearings 66 and 67 and rotated by means of reduction gearing including a gear 68 driven at a desired speed in timed relation to the rate of movement of the spring material 64 between the dies 50 and 51. The spring material 64 can be fed by feed rolls such as the feed rolls 37 and 38 shown in FIG. 4, or pulled by a rod 15 and cylinder 12 such as shown in FIG. 1.

By suitably shaping the cam 56, the spring can be provided, during its formation, with a uniformly varying curvature, or with a variable or irregular curvature, depending upon requirements. If the drive to the gear 68 is interrupted, the cam 56 can then be manually adjusted to a fixed position to maintain the die member 51 in fixed relation to the die member 50 to form a spring having any desired constant radius of curvature.

Adjustment of the member 51 may also be used to compensate for variations in the thickness of the material being formed into a spring. For example, strip or wire stock may vary in thickness due to errors in forming it, so that even a constant radius spring formed from such stock may actually vary somewhat in its spring characteristics. This variation can be overcome by determining the variations in thickness and forming the spring on a correspondingly varying radius of curvature.

FIG. 15 illustrates a constant tension spring embodying the principles of the present invention, associated with support means for enabling the same to function as a counterbalance, for example, for a window sash (not shown). Here, the spring $S^e$ is wound upon the outer periphery of a drum 70 rotatably mounted upon a pin 71 carried by a bracket 72. The bracket 72 comprises a base portion 73 and flanges 74 and 75 extending upwardly from the longitudinal edges thereof. The pin 71 is mounted in the flanges 74 and 75 and serves as a shaft supporting the drum 70 for free rotation relative thereto.

The radius of the drum 70 is preferably greater than the radius upon which the spring has been bent so that the inner convolutions 76 of the spring, in tending to assume its normal diameter, tightly grip the outer periphery of the drum. The end 77 of the innermost convolution 76 need not be interengaged with or fastened to the drum 70 in any manner. The free end 78 of the spring extends through an opening 79 formed in the bracket base 73 and said lower end may be perforated or suitably shaped for attachment to a window sash (not shown).

Inasmuch as the resistance offered to unwinding of the spring is not cumulative, the force required to unwind or straighten any given increment of the spring $S^e$ is the same for all other increments of the spring. Variations in the length of the moment arm for successive convolutions of the spring, as the spring is being unwound, can be compensated for by employing a spring which has its successive increments bent upon a variable radius.

In the case of a window counterbalance, the spring selected will be such that it will unwind when a pulling force of only a few ounces is applied so that very little physical effort is required to unwind the spring to effect lowering of the sash. On the other hand, the spring inherently rewinds itself as the sash is raised and, in this way, substantially counterbalances the weight of the sash so that only a very small physical force again need be applied to raise the sash.

Figure 16:
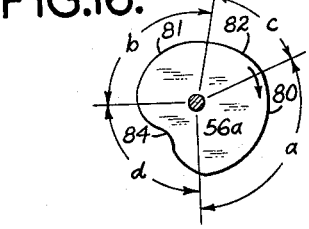
FIG. 16 is an elevational view of a modified cam adapted for use in the apparatus shown in FIG. 14 to automatically form a spring having the opposite end portions thereof bent upon different constant radii and an intermediate portion bent upon a varying radius.

FIG. 16 illustrates a modified form of cam $56^a$ which may be substituted in the apparatus shown in FIG. 14 for the cam 56. This cam includes a peripheral portion 80 defined by an arc $a$ of constant curvature and another portion 81 defined by an arc $b$ of constant curvature, but less than that of the portion 80. A portion 82 defined by an arc $c$ of uniformly varying curvature is disposed between the portions 80 and 81. The remainder of the cam 56 is defined by a portion including a pocket or depressed region 84 adapted to cooperate with the roller 61 upon the hold-down or die member 51 to permit maximum separation of the die members 50 and 51.

Figure 17:
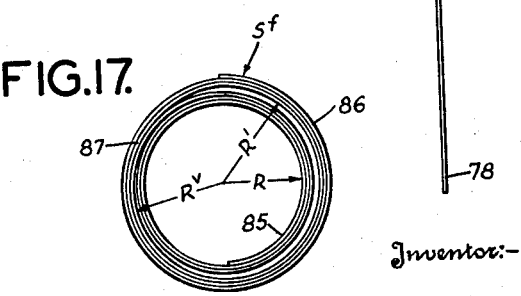
FIG. 17 is a schematic elevational view of a spring that can be produced by substituting the cam shown in FIG. 16 for the cam presently shown in FIG. 14.

It will be apparent that when the cam $56^a$ is mounted upon the shaft 65 and rotated in the direction indicated by the arrow, and the portion 80 is engaged with the roller 61, the die member 51 will be maintained in fixed spaced relation to the die member 50 so that the spring material then passing between the dies will be bent upon a constant radius. When the portion 82 of the cam is engaged with the roller, the die member 51 is permitted to gradually slide upon the rods 52 and 53 in a direction away from the die member 51 to progressively increase the width of the gap between the die members 50 and 51 and thereby cause the portion of the spring material then passing between said die members to be bent upon a varying, progressively increasing radius. As the cam $56^a$ continues to rotate, the portion 81 will contact the roller 61 and again maintain the die members 50 and 51 in fixed spaced relation, but with the gap wider than when the cam portion 80 was engaged with said roller. The spring material then being passed between the die members 50 and 51 will be bent upon a constant radius, greater than the radius R. A spring thus formed is diagrammatically illustrated in FIG. 17 and generally identified by the letter $S^f$. It will be noted from this figure that the inner convolutions 85 of the spring are formed upon a constant radius R, whereas the outer convolutions 86 of said spring are formed upon a relatively greater constant radius indicated by the letter R'. The intermediate convolutions 87 of the spring 84 are bent upon the constantly varying radius Rv, which progressively increases from the radius R to the radius R'. Reverse mounting or reverse driving of the cam $56^a$ will result in a spring having its convolutions bent in the reverse relation from that described above.

It will be apparent that by varying the contour of the cams 56 and $56^a$, a spring having any desired tension characteristics, constant or otherwise, can be automatically formed, and such desired characteristics can be accurately reproduced in the successive springs formed by the machine with any given cam design.

FIGS. 18 to 23 illustrate still another form of machine for automatically coiling springs which embodies the principles of the present invention.

Referring now more particularly to FIG. 18, the machine comprises a bed plate 100 supported upon frame members 101 at opposite edges, only one of said frame members being shown in the drawings. A bracket 102 is adjustably secured to the underside of the bed plate by machine bolts 103 and serves as a journal for a shaft 104 having a feed roll 105 secured thereto. A similar feed roll 106 is secured to a shaft 107 rotatably mounted in a bracket 108, which is also adjustably secured to the bed plate 100 by bolts 109. The brackets 102 and 108 carrying the feed rolls 105 and 106 are so adjusted that said feed rolls engage the spring material 109$^a$ with sufficient pressure to force the same through a pair of bending dies 110 and 111, which have confronting faces similar to those of the dies 22 and 23.

A guide 112 is interposed between the discharge side of the feed rolls 105 and 106 and the entrance gap G of the die blocks 110 and 111. The guide 112 comprises a bracket 113 secured to the underside of the bed plate 100 by bolts 114. The bracket 113 is provided with a channel 115 (FIG. 19) through which the spring material 109$^a$ passes and is guided so that it travels upwardly in a path perpendicular to the forming faces of the die blocks 110 and 111. In other words, the gap between the die blocks 110 and 111 is L-shaped, with one leg of the L in a straight line with the guide channel 115. The spring material 109$^a$ is retained in the channel 115 by a plate 116 secured to the bracket 113 by screws 117.

The die member 110 is secured to the bed plate 100 by a plurality of cap screws 118. The cooperating die block or hold-down member 111 is secured to an inclined platform 119 by a plurality of cap screws 120.

The platform 119 is supported at an angle of about 45° to the horizontal by a pair of guide rods 121 extending in a plane common to the radius of the convex corner of the die block 110. The lower end of each guide rod 121 is received in a bracket 122 adjacent one end of the die block 110. Each of the brackets 122 is secured to the bed plate 100 by cap screws 123. A pin 124 retains the lower end of the guide rods 121 in the brackets 122 and holds said rods against rotation. The upper end of each guide rod 121 is received in and supported by a bracket 125 secured to the bed plate by cap screws 126.

The guide rods 121 extend through an opening 127 extending transversely through the platform 119 and the intermediate portion of each guide rod 121 is provided with threads 128. The platform 119 is provided with longitudinal slots 129 each of which intersects one of the openings 127. An internally threaded travelling nut 130 is disposed in each of the slots and is engaged with the threads 128. Each of the nuts 130 is keyed, as best shown in FIG. 21, to a worm wheel 131, which is also disposed in each of the slots 129.

A reversible, constant speed electric motor 132 is mounted upon the platform 119 by bolts 133, and has a shaft 134 projecting from each end thereof. A worm 135 is secured to each end of the shaft 134 and meshes with one of the worm wheels 131. A conventional, electrically operated brake 136 is suitably mounted upon the platform 119 and is adapted to cooperate with the shaft 134 to prevent overrunning thereof at such time when the current to the motor 132 is cut off, all as will be explained more fully hereinafter.

It will be apparent from the foregoing that when the motor 132 is rotating in one direction, say forward, the worms 135 will cause the worm wheels 131 to turn and thus rotate the travelling nuts 130 to cause the platform 119 to travel along the guide rods 121 in a direction toward the die block 110, thereby moving the hold-down member 111 toward said die block and decreasing the width of the gap therebetween. On the other hand, when the motor 132 is rotated in the opposite, or reverse, direction the worms 135 will rotate the worm wheels 131 in the opposite direction and cause the platform 119 to travel along the guide rods 121 in a direction away from the die block 110, thereby increasing the width of the gap between said die block and the hold-down member 111. The pitch of the threads 128 and the drive ratio of the worm 135 and the worm wheel 131 are designed so as to move the hold-down member 111 relative to the die block 110 to bend the spring material 109$^a$ upon any constant or varying radius desired, so that the finished spring will have any tension characteristics desired.

The travel of the platform 119 carrying the hold-down member 111 may be controlled in any number of different ways. However, for illustrative purposes, one form of operative automatic, electric control means is illustrated and described herein. The control means is conveniently mounted upon a stationary platform 140 suitably secured to the machine legs 101. Bracket means 141 is mounted upon the platform 140 and rotatably supports a shaft 142. A control cam 143 is secured to the shaft 142 so that it is driven thereby. A roller 144 engages the periphery of the cam 143 and is rotatably mounted upon a pin 145 mounted in an arm 146. The arm 146 has one end thereof pivotally supported by a pin 148 mounted in one of the legs 101. A spring 149, which may be a constant tension spring embodying the principles of the present invention, has the coiled portion thereof engaged with an offset in the arm 146 and one end thereof is secured at 150 to a rod 151 mounted on the platform 140. The spring 149 thus constantly urges the roller 144 into contact with the periphery of the cam 143 under a constant pressure.

An upright rod 152 has its lower end threaded and mounted in a threaded opening 153 formed in the platform 140. A block or frame member 154, preferably formed of electrical insulating material, is adjustably secured to the rod 152 by a set screw 155, the portion of the rod 152 engaged by the frame 154 being rectangular in cross-section so that said frame cannot turn relative to said rod. The frame 154 includes an upper arm 156 having a conventional, normally open "Micro" switch 157 mounted thereon, and a lower arm 158 having a similar switch 159 mounted thereon.

The arm 146 carries a flat spring member 160 provided with an insulated double contact 161. The contact 161 is adapted to engage with a contact 162 on a C-shaped conductor mounted on the frame 154, or with a similar contact 163 on said conductor, depending upon which portion of the cam 143 is engaged with the roller 144. The contact 161 has an intermediate position in which it is engaged with neither contact 162 nor 163 and at such time the circuit to the motor 132 is interrupted, as will appear more fully hereinafter. However, the spring strip 160 is arranged so that it is adapted to engage and actuate the sensitive operating pin 164 of the "Micro" switch 157 shortly after the contact 161 has engaged the contact 162, and to likewise engage and actuate the sensitive pin 165 of the "Micro" switch 159 after the contact 161 has engaged the contact 163. The reason for this is that the contacts 162 and 163 are associated with relays, which will be described later, adapted to simultaneously release the brake 136 and complete the circuit to the motor 132, and alternatively, to simultaneously apply said brake and interrupt the circuit to said motor, all as will be described more fully later.

The cam 143 (FIG. 23) includes a portion 170 which is of greater radius than a portion 171 thereof. The cam 143 also includes portions 172 and 173 defined by a radius less than that of the portion 170 but greater than that of the portion 171. The roller 144 is shown engaged with the portion 172 at which time the contact 161 is in its intermediate position and is not engaged with either the contact 162 or the contact 163. When the portion 170 of the cam is engaged with the roller 144, the contact 161 will be raised into engagement with the contact 162, and when the cam portion 171 is engaged with the roller 144, the spring 149 will cause the arm 146 to move in a counterclockwise direction about its pivot 148 and thus engage the contact 161 with the contact 163.

The electrical control means for the machine further includes a normally closed relay 175 (FIG. 23) and a normally open relay 176, both of which may obviously be mounted upon the platform 140. The relays 175 and 176 are operated by six volt direct current produced by a transformer 177, which may also be mounted upon the platform 140.

FIG. 23 illustrates the manner in which the motor 132, brake 136, "Micro" switches 157 and 159, the relays 175 and 176, transformer 177, etc., are interconnected in a circuit for automatically controlling the machine. Thus, electric current is supplied to the machine through 110 volt A.C. main conductors 180 and 181. Leads 182 and 183 connect the conductors 180 and 181, respectively, with the primary coil of the transformer 177. A wire 184 connects one side of the secondary coil of the transformer with the contact 161. The other side of the secondary coil of the transformer 177 is connected by a wire 185 to the relay 175 whose contacts 186 and 187 are normally closed. Another wire 188 extends from the relay 175 to the relay 176 whose contacts 189 and 190 are normally open. Another wire 191 extends from the relay 176 to the contacts 162 and 163. Thus, the relays 175 and 176 are connected in series.

The "Micro" switch 157 is diagrammatically illustrated as comprising contacts 193 and 194, and the "Micro" switch 159 is similarly illustrated as comprising contacts 195 and 196.

One terminal 197 of the brake 136 is connected with the conductor 180 and the other terminal 198 is connected by a wire 199 with the contact 187 of the normally-closed relay 175. The other contact 186 of the relay 175 is connected by a wire 200 with the other conductor 181. With the contact 161 intermediate the contacts 162 and 163, as shown, the circuit to the brake 136 is completed through the conductor 180, wire 199, contacts 186 and 187 of the relay 175, wire 200 and conductor 181, so that the brake is applied and holds the motor shaft 134 against rotation. This relationship corresponds to the position of the roller 144 when engaged with either of the cam portions 172 and 173 of the control cam 143.

One terminal 201 of the motor 132 is connected by a wire 202 with the contact 189 of the normally-open relay 176, and the other contact 190 of said relay is connected by a wire 203 with the conductor 180. One of the contacts 193 of the switch 157 is connected by a lead 204 with the wire 202 and the other contact 194 of said switch is connected by a wire 205 with a second terminal 206 of the motor 132. The contact 195 of the "Micro" switch 159 is connected by a lead 207 with the wire 205, and the other contact 196 of said switch is connected by a lead 208 with the conductor 181, said conductor being connected to a third terminal 209 of said motor.

Assuming that the cam 143 has rotated clockwise to a position such that the cam portion 170 engages the roller 144, the contact 161 will then engage the contact 162, and the circuit to the relays 175 and 176 will be completed so that both relays are energized. The circuit is completed from one side of the secondary winding of the transformer 177 through the wire 185, the coil of relay 175, wire 188, the coil of relay 176, through the wire 191, contacts 162 and 161, and back through wire 184 to the other side of said secondary winding. Energization of the relay 175 opens the contacts 186 and 187 thereof, thereby interrupting the circuit to the brake 136 and releasing the motor shaft 134 for rotation. The simultaneous energization of the relay 176 causes the contacts 189 and 190 thereof to engage, and the actuation of the pin 164 of the "Micro" switch 157 by the spring strip 160 causes the contacts 193 and 194 of said switch to engage and thereby complete the circuit to the motor 132 to drive the same in a forward direction, i.e., to move the die member 110 to slowly decrease the width of the gap G, FIG. 18. The circuit to the motor 132 is then completed through the main conductor 180, relay contacts 189 and 190, and wire 202 and 204, "Micro" switch contacts 193 and 194, wire 205 to one terminal 206 of the motor 132, and from motor terminal 209 to the other main conductor 181. With the cam 143 designed as illustrated, the motor 132 will continue to rotate in a forward direction during almost a half revolution of the cam 143 indicated by the angle P. During this period, the platform 119 will be very slowly moved in a direction toward the die block 110, carrying the hold-down member 111 with it, so that the gap G between the hold-down member 111 and the die block 110 very slowly decreases with the result that the radius of curvature upon which the spring material is bent will very gradually decrease as the strip of spring material 109ª is passed between said die block and hold-down member. The bending of the spring material 109ª will have been completed by the time that the portion 173 of the cam 143 is engaged with the roller 144. At such time, the contact 161 will be returned to its intermediate position and the circuit will then be in the condition initially described, namely, with the brake 136 applied and the circuit to the motor 132 interrupted. Continued rotation of the cam 143 will then place the cam portion 171 in contact with the roller 144, thereby enabling the spring 149 to actuate the arm 146 to engage the contact 161 with the contact 163, whereupon the relays 175 and 176 are again energized as previously described, to effect release of the brake 136 and complete the circuit to the motor 180. The "Micro" switch 159 is actuated as an incident to the engagement of the contact 161 with the contact 163 through the actuation of the switch pin 165 by the spring arm 160 so that the contacts 195 and 196 of said switch are closed to thereby complete the circuit to the motor 132. The circuit to the motor 132 is then completed through the main conductor 180, relay contacts 189 and 190 and wire 202 to motor terminal 201 and from motor terminal 206 through wires 205, 207, "Micro" switch contacts 195 and 196, wire 208 and through the other main conductor 181. The motor will then be driven in a reverse direction to move the hold-down member 111 back to its initial position corresponding to the beginning of a bending operation to be performed upon a length of spring material. The cam portion 171 is defined by an arc $q$ which is equal to the arc $p$, so that the forward and reverse time periods of operation of the motor 132 are identical.

Any conventional cut-off means may be provided to sever the formed spring after the bending operation has been completed. FIG. 18 illustrates in dot-and-dash line an anvil 210 which may be mounted in any suitable manner upon the bed 100, and a cooperating cut-off member 211 which may be reciprocated relative to the anvil 210 by any conventional means. The cut-off member 211, of course, is to be automatically operated in proper timed relation with the movement of other parts of the machine.

In one mode of operation of the machine, the drive rolls 105 and 106 are rotated only during the portion of the cycle that the motor 132 is being operated in the forward direction, i.e., advancing the hold-down member 111 toward the die block 110 while the spring material is being bent. This will produce a constant tension spring in which the inner end of the spring is bent upon a greater radius of curvature than the outer end and in which the curvature of the bent portion of the spring progressively decreases from end to end. The operation of the feed rolls 105 and 106 is interrupted after the spring has been completely formed, and during the time that the motor is being driven in a reverse direction to return the hold-down member 111 to its retracted position preparatory to the bending of the spring material 109ª to form another spring.

FIG. 22 schematically illustrates drive means for the feed rolls 105 and 106 and the control cam 143, whereby the foregoing may be effected. Thus, a gear 215 is secured to the shaft 107 carrying the feed roll 106, and a gear 216 meshing with the gear 215 is secured to the shaft 104 carrying the other feed roll 105. A large gear 217 is mounted upon a main drive shaft 218, and is provided with teeth 219 extending only through half of its circumference, whereby to effect intermittent driving of the gear 216. The shaft 218 is journaled in a bracket 218a secured to the bed 100 and may be driven by any suitable means (not shown). A stop segment 220 is secured to the gear 216 in cooperating relation with a blocker segment 221 carried by the gear 219 at the portion of the periphery thereof which is devoid of the driving teeth 219. A gear 222 is secured to the drive shaft 218 and meshes with a gear 223 mounted upon the cam shaft 142. Thus, the cam shaft 142 is continuously rotated; whereas, the gears 216 and 215, which drive the feed rolls 105 and 106, are rotated only at such time as the portion of the cam 170 is engaged with the roller 144 and the hold-down member 111 is being very slowly advanced. The drive arrangement is such that the driving of the gear 216 is discontinued at the time that the platform 119 reaches the desired advanced position. The blocker segment 221 then cooperates with the stop 220 to hold the gear 216 stationary while the cam portion 171 is engaged with the roller 144 to effect driving of the motor 132 in a reverse direction to retract the platform 119 and the hold-down member 111 carried thereby to its starting position. Thus, the feed rolls 105 and 106 are idle while the hold-down member 111 is being retracted. The cut-off member 211 may be actuated at any time during the interval that the drive of the feed rolls 105 and 106 is interrupted.

While spring material 109a is being fed by the feed rolls 105 and 106, the guide means 112 will position said spring material for movement in a path substantially perpendicular to the working surfaces of the die blocks 110 and 111 so that as the spring material is bent and winds itself up into a coil, the several convolutions of the coil will be disposed in a substantially common radial plane.

While only one set of feed rolls and one guide has been illustrated in the machine disclosed in FIGS. 18 and 20, it will be apparent that any number of each may be employed, so that a plurality of springs may be simultaneously bent, and thus enable the same to be economically and quickly mass-produced in large numbers.

FIG. 24 illustrates a modified form of cam 230 that may be mounted upon the shaft 142 in lieu of the cam 143 to cause the die block 111 to be retracted instead of advanced at the beginning of a bending cycle to produce a spring having different characteristics from that formed under the control of the cam 143. The cam 230 includes two arcuate portions 231 and 232 corresponding to the portion 170 of the cam 143, but which, when engaged with the roller 144, actuate the contact 161 to effect operation of the motor 132 in a reverse direction at that time to retract the die member 111 in two stages from its fully advanced position. The cam 230 also includes arcuate portions 233, 234, 235 corresponding to portions 172 and 173, which respectively interrupt the circuit to the motor 132 and apply the brake 136 whenever these portions are engaged with the roller 144. A cam portion 236 disposed between the cam portions 233 and 235 corresponds to the portion 171 of cam 143 which, when engaged with the roller 144, effects driving of the motor 132 in a forward direction, to thereby advance and return the platform 119 and the die block 111 toward their initial starting position in one stage.

The cam portions 231 and 232, respectively, extend through an angle of 55° so that the motor 132 is intermittently driven in a reverse direction through a total angle of 110° of revolution of the cam 230 to gradually retract the die block 111. The cam portion 231 is effective for a period of time corresponding to an angular movement of 55° of the cam 230, the operation of the motor 132 being interrupted when the portion 234 of the cam engages with the roller 144, the reverse driving of the motor 132 being continued when the portion 232 of the cam 230 engages with the roller 144 for a period of time corresponding to another 55° of angular movement of the cam 230. The driving of the motor 132 is again interrupted when the cam portion 235 engages the roller 144, and its direction of rotation is subsequently changed and it rotates in a forward direction to return the die block 111 toward the die block 110 when the cam portion 236 is engaged with the roller 144. The forward drive continues for a period of time corresponding to a total angular rotation of 110° of the cam 230, so that the die block 111 is returned to exactly the same position it occupied close to the die block 110 at the beginning of the spring-forming cycle. The driving of the motor, of course, is again interrupted at the end of the cycle when the cam portion 233 is engaged with the roller 144.

It will be understood that the feed rolls 104 and 105 feed spring material to the die blocks 110 and 111 while the cam portions 231, 235 and 232 of cam 230 are actively engaged with roller 144, as is done while the cam portion 170 of cam 143 is active, and that the feed is interrupted before cam portion 236 becomes active.

FIG. 25 schematically illustrates a spring $S^h$ which can be formed under the control of the cam 230, it being understood that the spacing of the convolutions of said spring has been exaggerated for illustrative purposes. It will be noted that the inner convolutions 240 of the spring are bent upon a uniformly varying but increasing radius, corresponding to the retraction of the die block 111 during the time that the cam portion 231 is engaged with the roller 144. The intermediate convolutions 241 of the spring are bent upon a constant radius, corresponding to the interval that the portion 234 of the cam is engaged with the roller 144, and the circuit to the motor 132 is interrupted and the die block 111 is held stationary. The outer convolutions 242 of the spring are bent upon a uniformly varying but increasing radius, corresponding to the period during which the cam portion 232 is engaged with the roller 144 and the motor 132 is interrupted and the die block 111 is held stationary. The outer convolutions 242 of the spring are bent upon a uniformly varying but increasing radius, corresponding to the period during which the cam portion 232 is engaged with the roller 144 and the motor 132 is slowly moving the die block 111 away from the die block 110. The varying radius of the outer convolutions 241 is greater than the varying radius of the inner convolutions 240.

It will be understood that other cams, in addition to the cam 230, can be substituted for the cam 143 and properly timed with the machine cycle to provide coil springs having one or more portions thereof bent upon different constant radii, and/or one or more portions thereof bent upon different varying radii of curvature.

It will also be understood that the automatic control of the motor 132 can be rendered ineffective at any time by manually opening a main switch M, FIG. 23. Thus, if it is desired to form a number of springs by bending the spring material 109a upon any desired constant radius for the full length of the springs, then the circuit to the motor 132 can be manually interrupted by opening switch M when the hold-down member 111 is spaced the correct distance from the die member 110 to effect bending of said spring material upon such constant radius of curvature.

It will be apparent from the preceding description that the apparatus and the methods of forming the strips, as well as the characteristics of the resulting springs, may be modified considerably without departing from the invention. Therefore, the forms of the invention de-

I claim:

1. The method of making a non-cumulative force spring which comprises successively sharply bending to a predetermined radius each increment of an elongated piece of material having spring characteristics to effect an initial set of the material so that it tends to coil tightly on itself in one direction, reverse bending the material to set each increment of the material so that it still tends to coil tightly on itself in the same direction but on a radius larger than the radius of initial set and allowing the thusly treated material to wind itself up into a plurality of convolutions with the successive convolutions in contact, to thereby provide a tightly wound non-cumulative force spring.

2. The method of making a non-cumulative force spring which comprises successively sharply bending to a predetermined radius each increment of a length of an elongated piece of material having spring characteristics to effect an initial set of each increment of said length so that the said length tends to coil tightly on itself in one direction, partially straightening the length of material to set each increment of the length to a radius larger than the radius of initial set, the said length still tending to coil tightly on itself in the same direction and allowing the thusly treated material to wind itself up into a plurality of convolutions with the successive convolutions in contact to thereby provide a tightly wound non-cumulative force spring.

3. The method of making a non-cumulative force spring in a continuous operation which comprises first bending sharply successive increments of an elongated piece of metal having spring characteristics to set the metal so that it tends to coil tightly on itself in one direction, restraining the increments from coiling and reverse bending each increment of the metal after the first bending to set each increment of the metal so that it still tends to coil tightly on itself in the same direction but on a radius larger than the radius of initial set and allowing the thusly treated metal to wind itself up into a plurality of convolutions with the successive convolutions in contact, to thereby provide a tightly wound non-cumulative force spring.

4. The method of making a non-cumulative force spring in a continuous operation which comprises pulling an elongated piece of metal having spring characteristics around a forming member to bend sharply successive increments of said metal to set the metal so that it tends to coil tightly on itself in one direction, restraining the increments from coiling and reverse bending each increment of the metal to set each increment of the metal so that it still tends to coil tightly on itself in the same direction but on a radius larger than the radius of initial set and allowing the thusly treated metal to wind itself up into a plurality of convolutions with the successive convolutions in contact, to thereby provide a tightly wound non-cumulative force spring.

References Cited in the file of this patent

OTHER REFERENCES

| | | |
|---|---|---|
| 1,787,936 | Forest | Jan. 6, 1931 |
| 1,837,209 | Dallas | Dec. 22, 1931 |
| 1,985,501 | Hudson | Dec. 25, 1934 |
| 2,038,305 | Mikaelson et al. | Apr. 21, 1936 |
| 2,071,137 | Neidt | Feb. 16, 1937 |
| 2,179,011 | Hudson | Nov. 7, 1939 |
| 2,192,101 | Peskin | Feb. 27, 1940 |
| 2,246,239 | Brand | June 17, 1941 |
| 2,395,651 | Anderson | Feb. 26, 1946 |
| 2,609,191 | Foster | Sept. 2, 1952 |
| 2,609,192 | Lermont | Sept. 2, 1952 |
| 2,609,193 | Foster | Sept. 2, 1952 |
| 2,647,743 | Cook | Aug. 4, 1953 |